United States Patent
Nakayama

(10) Patent No.: US 6,690,825 B1
(45) Date of Patent: Feb. 10, 2004

(54) IMAGE PROCESSING APPARATUS AND METHOD

(75) Inventor: Tadayoshi Nakayama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/576,533

(22) Filed: May 23, 2000

(30) Foreign Application Priority Data

Jun. 16, 1999 (JP) .......................................... 11-169949

(51) Int. Cl.[7] ................................................ G06K 9/46
(52) U.S. Cl. ...................... 382/190; 382/103; 348/169
(58) Field of Search ................................ 382/103, 104, 382/107, 162, 181, 190, 203, 232, 233, 236, 238, 243; 348/169, 384.1, 394.1; 375/240.01, 240.08, 240.16; 386/68, 69; 704/246

(56) References Cited

U.S. PATENT DOCUMENTS

| | | | | |
|---|---|---|---|---|
| 4,471,683 A | * | 9/1984 | Brown | .................... 89/1.11 |
| 5,657,415 A | * | 8/1997 | Yamada | ....................... 386/69 |
| 5,684,886 A | * | 11/1997 | Kamada et al. | ............. 382/107 |
| 5,953,439 A | * | 9/1999 | Ishihara et al. | ............. 382/107 |
| 6,072,903 A | * | 6/2000 | Maki et al. | ................. 382/190 |
| 6,128,396 A | * | 10/2000 | Hasegawa et al. | .......... 382/103 |
| 6,335,985 B1 | * | 1/2002 | Sambonsugi et al. | ....... 382/190 |

OTHER PUBLICATIONS

Zen, et al "Moving Object Detection from MPEG Coded Picture", IEEE, pp. 25–29, Feb. 1999.*

* cited by examiner

*Primary Examiner*—Daniel G. Mariam
(74) *Attorney, Agent, or Firm*—Fitzpatrick, Cella, Harper & Scinto

(57) ABSTRACT

An image processing apparatus and method in which voice information is input to specify an object contained in a moving picture, the input voice information is recognized and analyzed, parameters representing the object to be extracted are generated based upon the result of recognition and analysis, and the object is extracted from the moving picture based upon the extracted/generated parameters.

9 Claims, 4 Drawing Sheets

IMAGE PROCESSING APPARATUS AND METHOD

FIELD OF THE INVENTION

This invention relates to an image processing apparatus and method and, more particularly, to an image processing apparatus and method for extracting an object from a moving picture.

BACKGROUND OF THE INVENTION

With the start of CATV and CS (Commercial Satellite) broadcast having multiple channels, the reutilization of broadcast material has been contemplated and there is a need to produce high-quality TV programs at low cost. This is facilitated by reutilizing moving pictures and content. In order to obtain moving-picture content that is easy to reutilize, it is necessary to extract objects from the moving picture and to use moving pictures on a per-object basis.

In accordance with the MPEG4 format, the standardization of which is being forwarded internationally, a per-object coding function is used and a framework for combining objects flexibly has been set up in order to facilitate the handling of objects. If this standardization proceeds, it is believed that the reutilization of objects will advance in the future.

The chroma key technique has been used generally as a method of generating object data. This technique involves shooting an object placed in front of a blue screen to obtain a video signal, extracting a signal area corresponding to the blue background and, using the signal area as a key signal, distinguishing the object from other items based upon the video signal.

In a case where the chroma key technique is used, an object is created on the basis of a limited shooting environment. That is, the shooting requirement that only the object be shot in front of a blue screen is a restriction. If the object is a very large object such as an airplane or ship, for example, obtaining the object data is impossible in actuality.

Another method available includes extracting objects from a moving picture obtained by shooting in a freer shooting environment and arranging these objects successively to obtain a moving-picture object. However, designating objects that are to be extracted is a major task. More specifically, extracting objects from one image after another constituting the moving picture is a major undertaking. This method cannot be said to be suited to the processing of a large number of moving pictures.

SUMMARY OF THE INVENTION

Accordingly, an object of the present invention is to efficiently extract objects contained in a moving picture.

According to a preferred embodiment of the present invention, the foregoing object is attained by providing an image processing apparatus comprising: input means for inputting information which specifies an object contained in a moving picture, and extraction means for extracting the object from the moving picture based upon the input information.

Further, according to a preferred embodiment of the present invention, the foregoing object is attained by providing an image processing apparatus comprising: input means for inputting voice information which specifies an object contained in a moving picture; recognition means for recognizing the input voice information; and extraction means for extracting an object from the moving picture based upon the result of recognition by the recognition means.

Further, according to a preferred embodiment of the present invention, the foregoing object is attained by providing an image processing apparatus comprising: input means for inputting information which specifies an object contained in a moving picture; generating means for generating parameters from the input information; and extraction means for extracting the object from the moving picture based upon the parameters generated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An image processing apparatus according to preferred embodiments of the present invention will be described in detail with reference to the drawings.

First Embodiment

[Construction]

Figure 1:
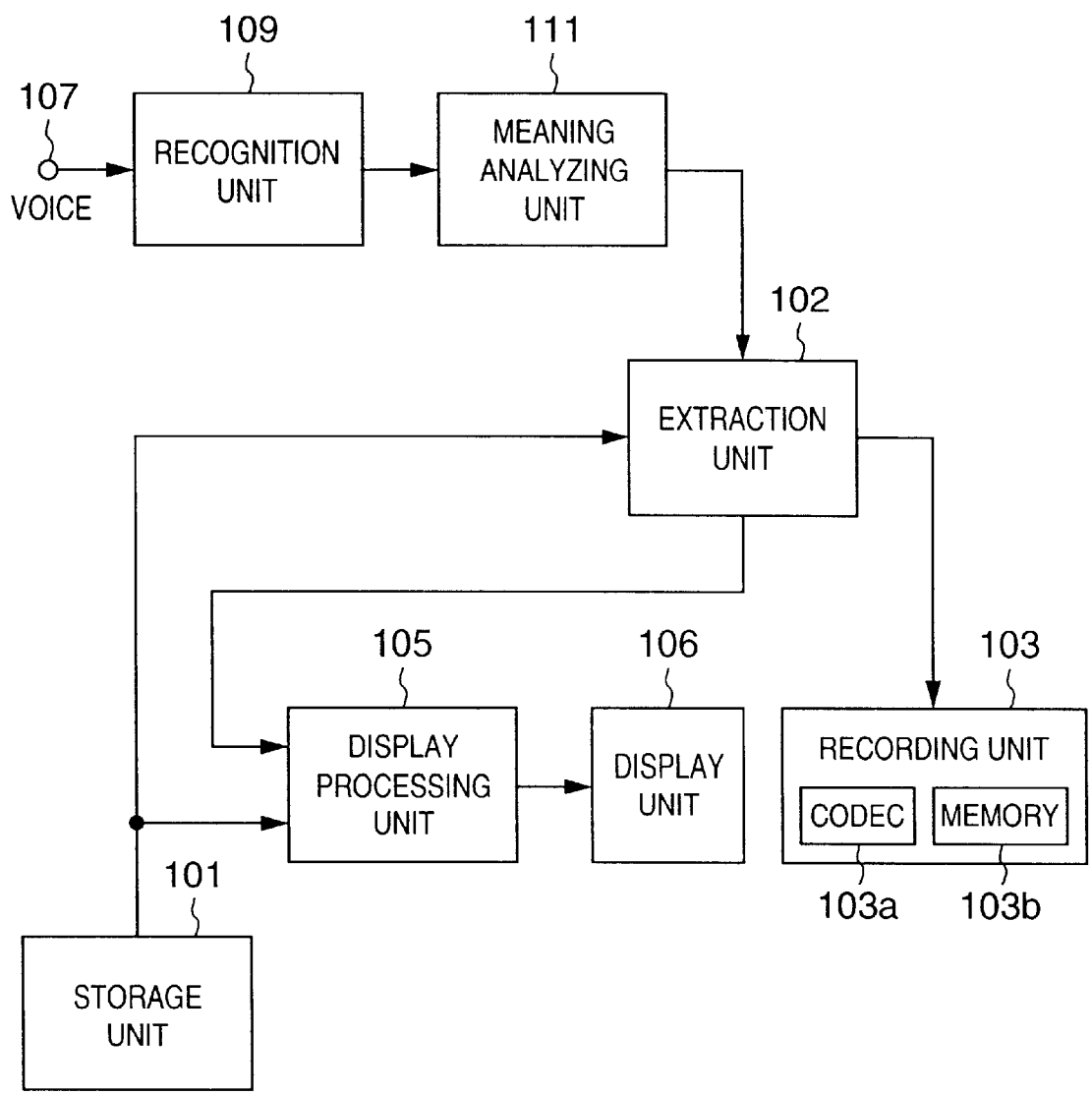
FIG. 1 is a block diagram illustrating the construction of an image processing apparatus according to a first embodiment of the present invention.

FIG. 1 is a block diagram illustrating the construction of an image processing apparatus according to a first embodiment.

As shown in FIG. 1, the apparatus includes a storage unit 101 in which moving-picture data is accumulated and recorded; an extraction unit 102 for extracting object images; a recording unit 103 for recording shape information, which represents the shape of an object extracted by the extraction unit, as well as the object image; a display processing unit 105 for converting image data, which has been read out of the storage unit 101, to a signal of a form suitable for display; a display unit 106 for displaying video based upon a video signal output from the display processing unit 105; a terminal 107 to which voice is applied; a recognition unit 109 for recognizing voice that has been input; and a meaning analyzing unit 111 for analyzing the meaning of voice information that has been recognized.

Figure 2:
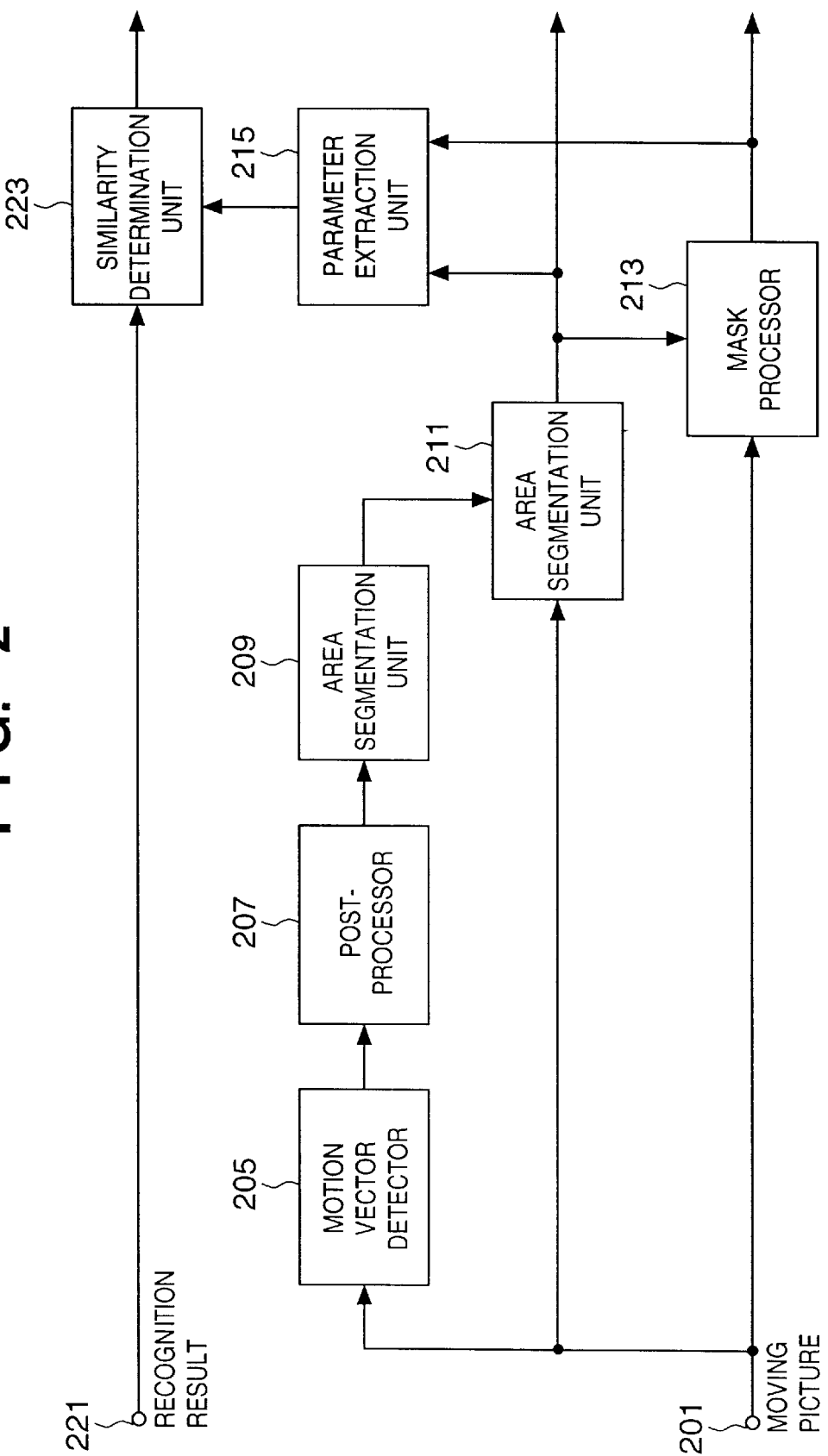
FIG. 2 is a block diagram illustrating the construction of an object extracting unit shown in FIG. 1.

FIG. 2 is a block diagram showing the construction of the extraction unit 102.

As shown in FIG. 2, the extraction unit 102 includes a terminal 201 to which a moving picture is input; a terminal 221 to which information that has been recognized and analyzed by the recognition unit 109 and meaning analyzing unit 111 is input; a motion-vector detector 205 for detecting motion vectors, on a block-by-block basis, from the input moving picture; a post-processor 207 for judging suitability in a case where a motion vector of a block of interest is replaced by a representative motion vector of a peripheral block; an area segmentation unit 209 for connecting successive blocks based upon the motion vectors and segmenting the image into a plurality of areas; an area segmentation unit 211 for segmenting an image into areas on a per-pixel basis based upon the result of segmentation by the area segmentation unit 209; a mask processor 213 for masking areas other than objects based upon object shape information, which is the result of area segmentation on a per-pixel basis; a parameter extraction unit 215; and a similarity determination unit 223.

[Processing]

Figure 3:
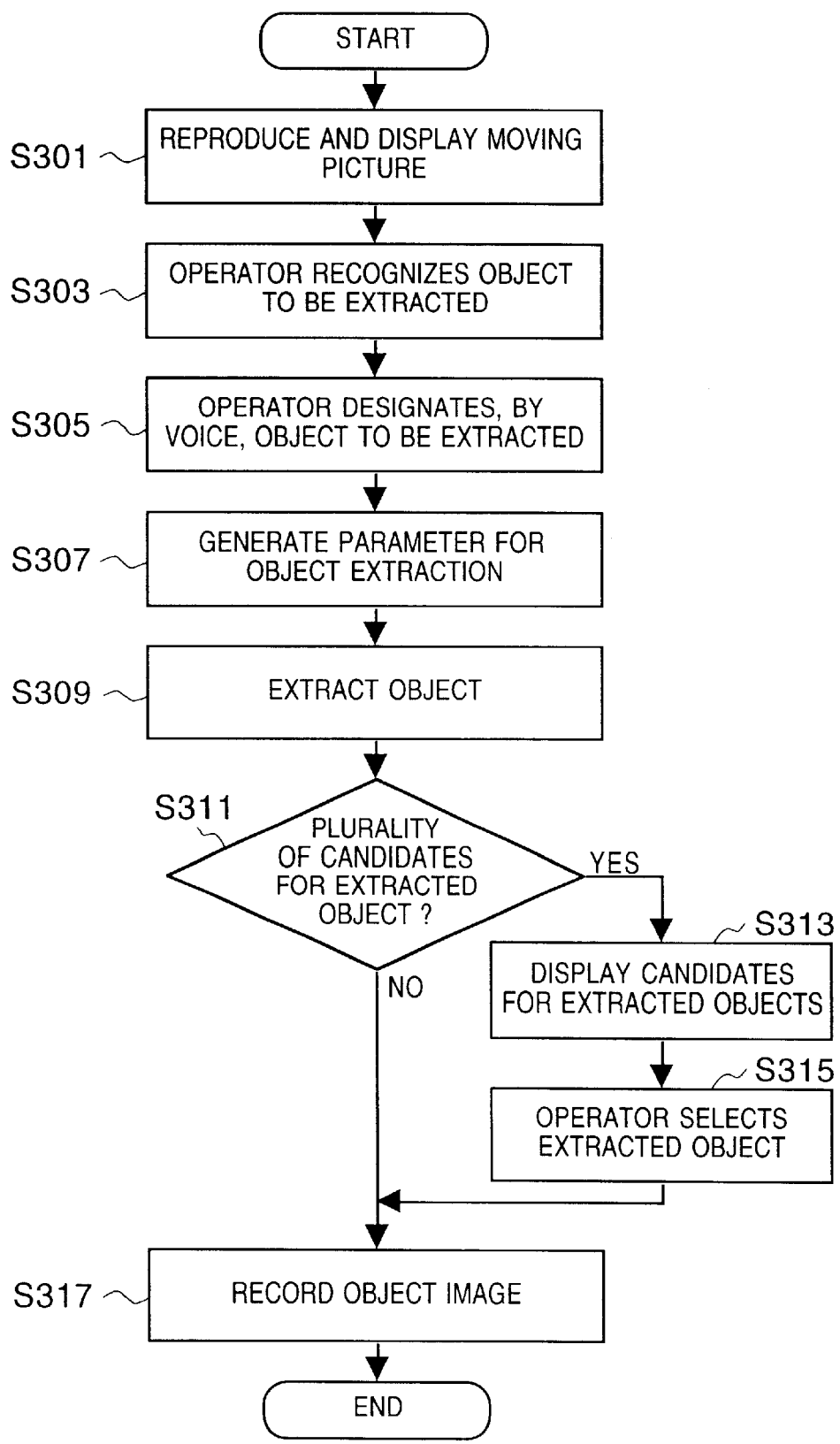
FIG. 3 is a flowchart illustrating object extraction processing according to the first embodiment.

FIG. 3 is a flowchart illustrating processing for extracting objects according to the first embodiment.

A moving picture is reproduced and displayed at step S301 in FIG. 1. This involves using the display processing unit 105 to process moving-picture data that has been read out of the storage unit 101 and displaying the processed data on the display unit 106. If the image data read out of the storage unit 101 is data that has been coded and compressed, the display processing unit 105 decodes and decompresses the data, adds on a synchronizing signal for display purposes and sends the resulting signal to the display unit 106.

This is followed by step S303, at which the operator observes the displayed moving picture and identifies the object that is to be extracted, and then by step S305, at which the operator designates by voice the object to be extracted. Specifically, the operator designates the object by voice as by uttering "the red car traveling from left to right".

The voice specifying the object to be extracted is sent to the terminal 107. First parameters (numerical and statistical information) serving as a reference for extraction of the object are generated from the voice information at step S307. In a case where "the red car traveling from left to right" has been specified, the first parameters are generated and indicate, by way of example, that the motion vector of the object is positive along the x axis, that the relationship among the R, G, B levels is R>G and R>B, and that the position of the center of gravity is on the lower side. In other words, the voice of the operator is recognized by the recognition unit 109 and the meaning analyzing unit 111 analyzes the meaning of the voice information and separates from this information the keywords of the object to be extracted. By referring to a database or the like with which the meaning analyzing unit 111 is equipped, the first parameters are generated from features possessed by the separated keywords.

Next, extraction of the object is performed based upon the first parameters at step S309. This object extraction processing will be described in detail with reference to FIG. 2.

Moving-picture data, upon being subjected to decoding processing if necessary, is input to the terminal 201, whence the data is sent to the motion vector detector 205. The motion vector detector 205 obtains motion-vector information by finding where the block of the currently entering image data (frame) was located one frame previously.

The motion-vector information is found block by block, and a group of blocks contained completely within the same object should have the same motion-vector information. However, the vector information actually obtained develops some variation owing to the influence of noise or the like. Further, if there are a plurality of blocks having the same pattern, there are instances where motion vectors unrelated to the actual direction of movement are detected. Accordingly, if one motion vector of all blocks in a frame is found by the motion vector detector 205, the processing described below is executed by the post-processor 207.

If there is a prescribed significant difference between the motion vector of a block of interest and a motion vector (referred to as an "alternate motion vector" below) that has been found from the median of motion vectors of a plurality of blocks neighboring the block of interest, the suitability of the alternate motion vector is determined. In other words, the disparity between the data of the block indicated by the alternate motion vector and the data of the block of interest is computed and the disparity thus obtained is compared with a threshold value to evaluate the alternate motion vector. If the alternate motion vector is judged to be appropriate, the motion-vector value of the block of interest is replaced by the alternate motion vector. If the alternate motion vector is judged to be inappropriate, however, no replacement is made. As a result, isolated points of motion vectors are eliminated and edges can be smoothed.

Next, the area segmentation unit 209 connects successive blocks based upon the degree of similarity of motion vectors and segments the image (frame) into a plurality of areas. However, in a case where a plurality of objects (or areas) exist within one block, the motion vector of the block becomes ambiguous because of the effects of the motion of both objects. Such a block is not segmented needlessly and is classified as an unsegmented area (block). Conversely, a segmented area obtained by connecting successive blocks is referred to as a segmented area. A pixel contained in a block that belongs to an unsegmented area is considered to have a high possibility of belonging to any of a plurality of areas neighboring this block. Accordingly, the area segmentation unit 211, which performs area segmentation pixel by pixel, assigns the pixels in a block belonging to an unsegmented area to other areas to complete the area segmentation of the overall image (frame).

More specifically, several pixels of a block in an unsegmented area are considered to belong to a segmented area that is contiguous to this unsegmented area. Accordingly, the degrees of similarity of the pixels in the two areas are evaluated pixel by pixel and pixels of a block in an unsegmented area are connected to the segmented area. In the case of an unsegmented area bracketed by two segmented areas, it is possible to obtain a threshold value based upon a representative value of the pixels of the two segmented areas and to classify the pixels in the block of the unsegmented area based upon this threshold value.

By expanding the area segmentation information of individual blocks on a pixel-by-pixel basis and connecting this information with area segmentation area of individual pixels, shape area information of every segmented area is obtained. The shape information is obtained by allocating, to pixels which do and do not belong to an object, code (e.g., binary values or multiple values of 0 to 255) for distinguishing these pixels. Here the size of shape information is the same as the size of the image.

The area segmentation unit 211 outputs the shape information generated on a per-object basis. On the basis of the shape information input thereto, the mask processor 213 applies mask processing to the image (frame) that enters from the terminal 201. The mask processing leaves image data of an object area as is and replaces other areas with a tone that is not conspicuous. Since mask processing is applied to each item of shape information, there is generated an image obtained by subjecting one frame (image) of a moving picture to mask processing a plurality of times.

The shape information, the image obtained by applying the mask processing corresponding to this shape information and motion-vector information is input to the parameter extraction unit 215, which proceeds to obtain various second parameters, such as direction of movement, size (area in terms of the image) and color tone of the object to be extracted.

The second parameters thus obtained and the first parameters generated at step S307 are input to the similarity determination unit 223, which judges the degrees of similarity between the first and second parameters. The similarity determination unit 223 adds the result of the determination onto the shape information and indicates whether the object corresponding to the shape information is a candidate for an extracted object.

In the processing described above, it is possible that a plurality of objects will be candidates for extracted objects. At step S311, therefore, it is determined whether there is only one candidate for an extracted object. If there are a plurality of candidates, these objects are displayed at step S313. While observing this display, the operator selects the object to be extracted from among the displayed plurality of objects at step S315. In order to display the plurality of candidates for extracted objects, it will suffice to reduce the size of each mask-processed image in dependence upon the number of candidates for extracted objects and then connect these images to construct the image of the original size.

In a case where there is only one candidate for an extracted object, this candidate, or in a case where an extracted object has been selected, this object, is recorded in the recording unit 103 along with the shape information at step S317. There are various methods of recording this on the recording unit 103. These will now be summarized.

(1) Recording method 1: Though object shape is arbitrary, it is generally necessary to make the image a rectangular image of a prescribed size in the horizontal direction in order to display the shape or record it by a recording apparatus in the form of a video signal. Accordingly, the image recorded is an image in which pixels of specific values that are distinguishable from the object are packed to surround the object until the prescribed image size is attained. When an object image becomes necessary, the recorded image is reproduced and the portion obtained by eliminating the pixels of the specific values is extracted as the object image. If, in a case where the content of an object is to be checked, the reproduced object is output to a monitor or the like, anything other than the object will be the pixels of the specific values, as a result of which the object can be identified with ease.

(2) Recording method 2: If shape information is considered in the same way as a chroma key signal, the original moving picture is left as is, a time code for achieving synchronization with the moving picture on a per-frame basis is added onto the shape information and only the shape information is recorded. When an object image becomes necessary, the moving picture and the shape information are reproduced in synchronized fashion and a partial area of the moving picture is cut from the image as an object based upon the shape information.

In a case where an object image is to be recorded in the recording unit 103, the recording unit 103 codes and compresses the object image by a coder/decoder (codec) 103a and stores the result in a memory 103b. In a case where a coded and compressed object image is to be reproduced, the recording unit 103 decodes and decompresses the image by the codec 103a.

Thus, in accordance with the first embodiment, information for specifying an object image (a partial image) contained in a moving picture is entered and the object is extracted based upon this information, whereby it is possible to efficiently extract the object image contained in the moving picture.

Second Embodiment

An image processing apparatus according to a second embodiment will now be described. It should be noted that components in the second embodiment that are similar to those of the first embodiment are designated by like reference characters and need not be described again.

Figure 4:
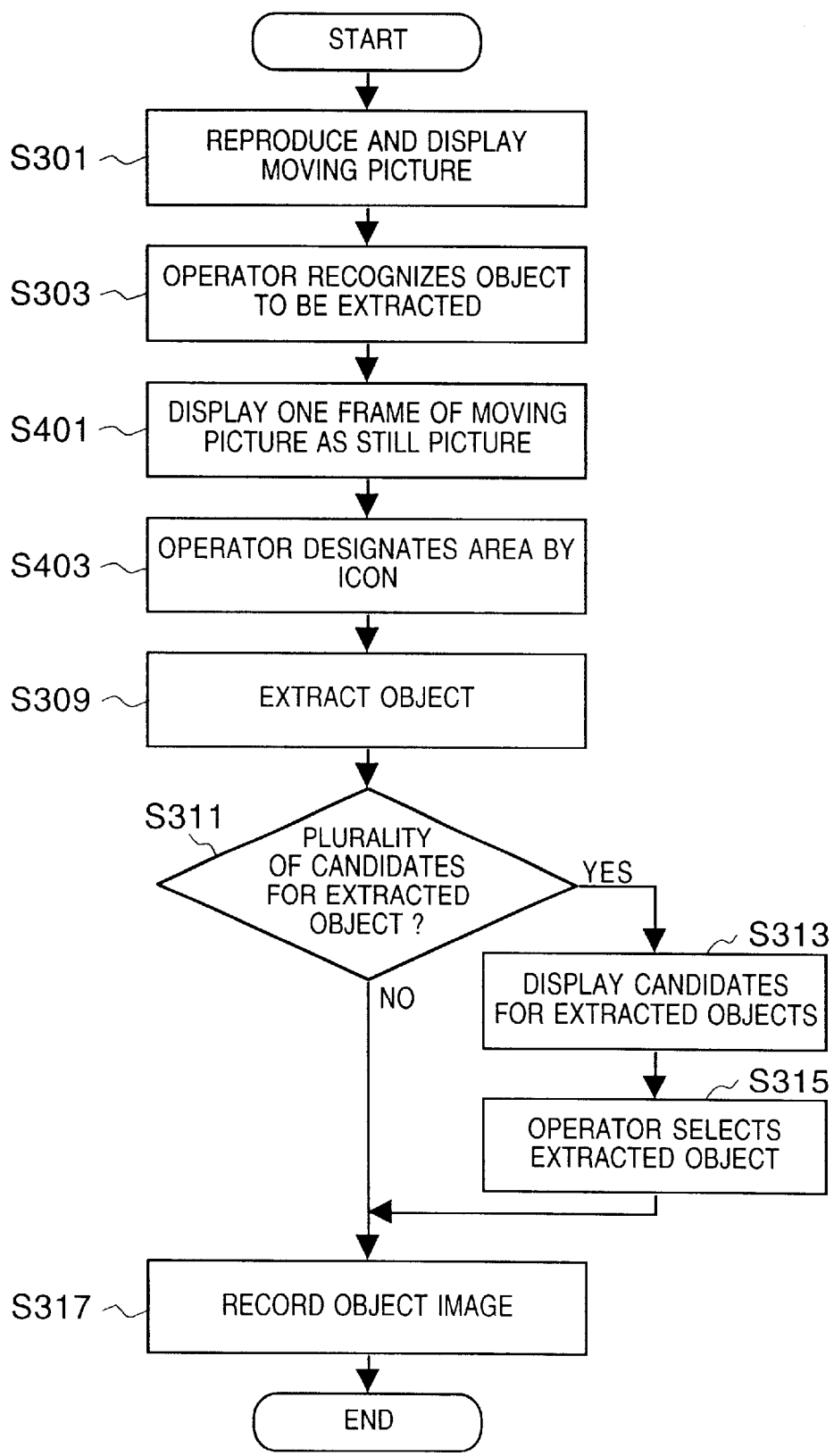
FIG. 4 is a flowchart illustrating object extraction processing according to a second embodiment.

FIG. 4 is a flowchart showing processing for object extraction according to the second embodiment.

The second embodiment differs from the first embodiment in the processing of steps S305 and S307 shown in FIG. 3. Specifically, in this embodiment, the designation of an object to be extracted is performed on a still picture.

After the object to be extracted has been recognized by the operator at step S303, a frame of the moving picture is displayed as a still picture at step S401. Next, at step S403, the operator uses an input device, such as a mouse or digitizer connected to the apparatus, to designate one point in an object to be extracted from the displayed frame (image), an area in the object or an area that includes the object. This is followed by step S309, at which the image is segmented into areas by the above-described processing and the object that was designated at step S403 is extracted.

In a case where one point in an object to be extracted or an area within an object is designated, a plurality of objects will not become extraction candidates. However, in a case where an area containing an object to be extracted is designated, there are instances where objects other than the object to be extracted also become extraction candidates. In such case, processing from this point onward is the same as the processing of steps S311 to S317 described earlier.

Thus, in accordance with each of these embodiments described above, there can be provided an image processing apparatus and method through which objects contained in a moving picture can be extracted efficiently.

It goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
a display unit for displaying a moving picture;

an input unit for inputting a keyword that specifies a moving object image contained in the moving picture;

a first parameter extraction unit for generating a first parameter based on a distinctive feature of the input keyword;

a second parameter extraction unit for recognizing at least one moving object included in the moving picture and acquiring a second parameter indicating a distinctive feature of the moving object; and an extraction unit for extracting the object from the moving picture based upon the degree of similarity between the first parameter and the second parameter, wherein keyword input is by an operator observing the moving picture displayed on the display unit.

2. The apparatus according to claim 1, wherein the keyword that specifies the object indicates the direction of movement of the specified moving object in the moving picture.

3. The apparatus according to claim 1, wherein the keyword that specifies the object indicates the color of the specified moving object in the moving picture.

4. The apparatus according to claim 1, wherein the keyword that specifies the object indicates the shape of the specified moving object in the moving picture.

5. The apparatus according to claim 1, further comprising a memory in which an extracted object is stored.

6. The apparatus according to claim 1, further comprising coding means for coding an extracted object and storing the code in memory.

7. An image processing apparatus comprising:

a display unit for displaying a moving picture;

an input unit for inputting a keyword that specifies a moving object image contained in the moving picture;

a recognition unit for recognizing the input keyword;

a first parameter extraction unit for generating a first parameter based on a distinctive feature of the input keyword;

a second parameter extraction unit for recognizing at least one moving object included in the moving picture and acquiring a second parameter indicating a distinctive feature of the moving object; and an extraction unit for extracting the specified moving object from the moving picture based upon the degree of similarity between the first parameter and the second parameter;

wherein keyword input is by an operator observing the moving picture displayed on the display unit, the input unit inputs the keyword as voice information, and the first parameter extraction unit generates the first parameter by recognizing the meaning of the voice information.

8. An image processing method comprising the steps of:

displaying a moving picture;

inputting a keyword that specifies a moving object image contained in the moving picture;

generating a first parameter based on a distinctive feature of the input keyword;

recognizing at least one moving object included in the moving picture and acquiring a second parameter indicating a distinctive feature of the moving object; and extracting the specified moving object from the moving picture based upon the degree of similarity between the first parameter and the second parameter, wherein keyword input is by an operator observing the moving picture displayed on the display unit.

9. A computer program product comprising a computer-readable medium having computer program code for image processing, said product comprising:

display-process procedure code for displaying a moving picture;

input-process procedure code for inputting a keyword that specifies a moving object image contained in the moving picture;

first parameter generating-process procedure code for generating a first parameter based on a distinctive feature of the input keyword;

second parameter generating-process procedure code for recognizing at least one moving object included in the moving picture and acquiring a second parameter indicating a distinctive feature of the moving object; and extraction-process procedure code for extracting the specified moving object from the moving picture based upon the degree of similarity between the first parameter and the second parameter, wherein keyword input is by an operator observing the moving picture displayed on the display unit.

\* \* \* \* \*